United States Patent
Brehmer et al.

(10) Patent No.: US 10,406,908 B2
(45) Date of Patent: Sep. 10, 2019

(54) TRANSMISSION FOR A MOTOR VEHICLE, DRIVE TRAIN FOR A HYBRID VEHICLE, AND METHOD FOR OPERATING SUCH A DRIVE TRAIN

(71) Applicant: ZF Friedrichshafen AG, Friedrichshafen (DE)

(72) Inventors: Martin Brehmer, Tettnang (DE); Stefan Beck, Eriskirch (DE); Matthias Horn, Tettnang (DE); Johannes Kaltenbach, Friedrichshafen (DE); Julian King, Rankweil (AT); Jens Moraw, Friedrichshafen (DE); Eckehard Münch, Bünde (DE); Juri Pawlakowitsch, Kressbronn (DE); Stephan Scharr, Friedrichshafen (DE); Viktor Warth, Friedrichshafen (DE); Michael Wechs, Weißensberg (DE); Peter Ziemer, Tettnang (DE); Uwe Griesmeier, Markdorf (DE); Raffael Kuberczyk, Ravensburg (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 18 days.

(21) Appl. No.: 15/574,368

(22) PCT Filed: Apr. 18, 2016

(86) PCT No.: PCT/EP2016/058513
§ 371 (c)(1),
(2) Date: Nov. 15, 2017

(87) PCT Pub. No.: WO2016/184626
PCT Pub. Date: Nov. 24, 2016

(65) Prior Publication Data
US 2018/0134140 A1 May 17, 2018

(30) Foreign Application Priority Data

May 18, 2015 (DE) .................. 10 2015 209 050

(51) Int. Cl.
*B60K 6/365* (2007.10)
*B60K 6/48* (2007.10)
(Continued)

(52) U.S. Cl.
CPC .............. *B60K 6/365* (2013.01); *B60K 6/48* (2013.01); *B60K 6/547* (2013.01); *F16H 3/663* (2013.01);
(Continued)

(58) Field of Classification Search
CPC .................. F16H 2200/0052–0078; F16H 2200/2007–2017; F16H 2200/2043–2061
See application file for complete search history.

(56) References Cited

U.S. PATENT DOCUMENTS 8,617,022 B1  12/2013  Vernon et al.
2003/0186775 A1*  10/2003  Ishimasu ............ F16H 3/66
                                                       475/275
(Continued)

FOREIGN PATENT DOCUMENTS

JP      2004176765 A  *  6/2004
WO  WO 2007/076749 A2    7/2007

OTHER PUBLICATIONS

International Search Report (English Translation) PCT/EP2016/058513, dated Jun. 14, 2016. (2 pages).

*Primary Examiner* — Jacob S. Scott
*Assistant Examiner* — James J Taylor, II
(74) *Attorney, Agent, or Firm* — Dority & Manning, P.A.

(57) ABSTRACT

A gearbox (G) for a motor vehicle having a drive shaft (GW1); an output shaft (GW2); an electric machine (EM);
(Continued)

and first and second minus planetary gear sets (P1,P2), the first planetary gear set (P1) being a stepped planetary gear set. A ring gear (E31) of the first planetary gear set (P1) is rotationally fixedly immobilizable via a fourth shift element (06). The first sun gear (E111) of the first planetary gear set (P1) is rotationally fixedly immobilizable via a fifth shift element (03). The output shaft (GW2) is connected to the ring gear (E32) of the second planetary gear set (P2). A rotor (R) of the electric machine (EM) is continuously connected to the drive shaft (GW1). The first sun gear (E111) of the first planetary gear set (P1) is not continuously rotationally fixedly connected to or operatively connectable by the shift elements with any further electric machine.

15 Claims, 7 Drawing Sheets

(51) Int. Cl.
*B60K 6/547* (2007.10)
*F16H 3/66* (2006.01)
*F16H 3/72* (2006.01)
*F16H 3/44* (2006.01)

(52) U.S. Cl.
CPC ...... *F16H 3/724* (2013.01); *B60K 2006/4825* (2013.01); *B60Y 2200/92* (2013.01); *F16H 2003/445* (2013.01); *F16H 2200/0052* (2013.01); *F16H 2200/0086* (2013.01); *F16H 2200/2007* (2013.01); *F16H 2200/2043* (2013.01); *F16H 2200/2046* (2013.01); *F16H 2200/2064* (2013.01); *F16H 2200/2094* (2013.01); *Y02T 10/6221* (2013.01); *Y02T 10/6252* (2013.01); *Y10S 903/911* (2013.01); *Y10S 903/919* (2013.01)

(56) References Cited

U.S. PATENT DOCUMENTS

2007/0275813 A1 11/2007 Raghavan
2013/0267366 A1 10/2013 Mellet et al.

\* cited by examiner

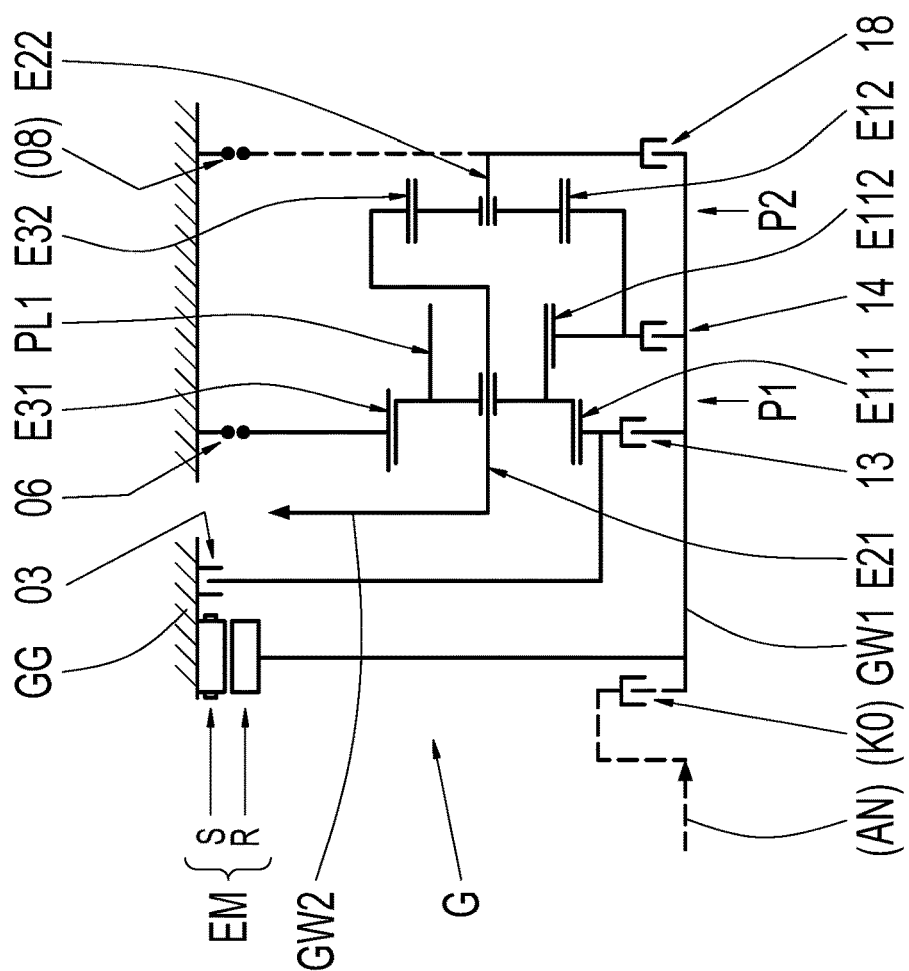

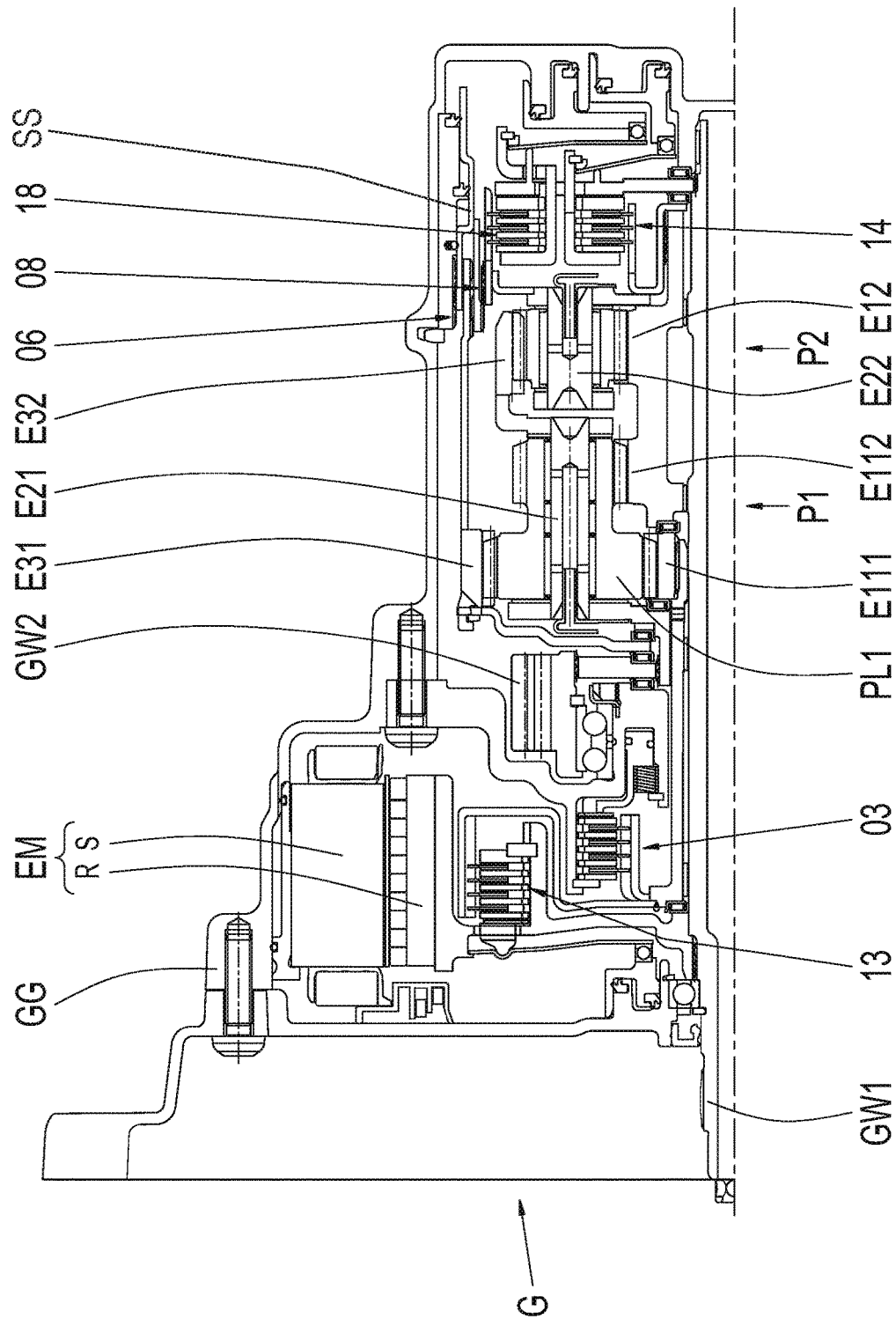

TRANSMISSION FOR A MOTOR VEHICLE, DRIVE TRAIN FOR A HYBRID VEHICLE, AND METHOD FOR OPERATING SUCH A DRIVE TRAIN

FIELD OF THE INVENTION

The invention relates generally to a gearbox for a motor vehicle, to a drive train for a hybrid vehicle with such a gearbox, and to a method for operating such a drive train.

BACKGROUND

The Applicant's Patent Application DE 10 2014 226 699.8, which is not a prior publication, describes a gearbox having an input shaft, an output shaft, a first planetary gear set which is a stepped planetary gear set and the planetary gears of which have two different effective diameters, and a second planetary gear set, wherein the first and the second planetary gear set are minus gear sets. A first sun gear of the first planetary gear set engages the larger effective diameter of the planetary gears. A second sun gear of the first planetary gear set engages the smaller effective diameter of the planetary gears. The second sun gear of the first planetary gear set is continuously connected to a sun gear of the second planetary gear set. A carrier of the first planetary gear set is continuously connected to a ring gear of the second planetary gear set. The input shaft is connectable via a first shift element to the carrier of the second planetary gear set and via a second shift element to the second sun gear of the first planetary gear set. The output shaft is connected to the ring gear of the second planetary gear set. This gearbox furthermore has an electric machine, wherein the input shaft is connectable to a rotor of the electric machine via a third shift element. The first sun gear of the first planetary gear set is connected to the rotor either continuously or selectively via an additional shift element. A ring gear of the first planetary gear set is rotationally fixedly immobilizable via a fourth shift element.

SUMMARY OF THE INVENTION

Therefore, the object of the invention is to provide an alternative embodiment to the gearbox described above.

A gearbox refers particularly to a multi-ratio gearbox in which a multiplicity of gear ratios, that is to say fixed transmission ratios, between two shafts of the gearbox are selectable, preferably automatically, by shift elements. The shift elements are in this case for example clutches or brakes. Such gearboxes are used particularly in motor vehicles for the purposes of suitably adapting the rotational speed and torque output characteristics of the drive unit to the driving resistances of the vehicle.

The gearbox according to the invention has a drive shaft, an output shaft, and a first planetary gear set, a second planetary gear set, an electric machine or motor with a rotatable rotor and with a rotationally fixed stator, and at least five shift elements. The two planetary gear sets are minus gear sets.

A planetary gear set includes a sun gear, a carrier and a ring gear. Rotatably mounted on the carrier are planetary gears which mesh with the toothing of the sun gear and/or with the toothing of the ring gear. A minus gear set refers to a planetary gear set with a carrier on which the planetary gears are rotatably mounted, having a sun gear and having a ring gear, wherein the toothing of at least one of the planetary gears meshes both with the toothing of the sun gear and with the toothing of the ring gear, as a result of which the ring gear and the sun gear rotate in opposite directions of rotation when the sun gear rotates in the presence of a static carrier. A plus gear set differs from the minus planetary gear set described directly above in that the plus gear set has inner and outer planetary gears which are mounted rotatably on the carrier. The toothing of the inner planetary gears meshes at one side with the toothing of the sun gear and at the other side with the toothing of the outer planetary gears. Furthermore, the toothing of the outer planetary gears meshes with the toothing of the ring gear. This has the result that, in the presence of a static carrier, the ring gear and the sun gear rotate in the same direction of rotation.

The first planetary gear set is a stepped planetary gear set, the planetary gears of which have two differently sized effective diameters. A first sun gear of the first planetary gear set engages the larger effective diameter of the planetary gears. A second sun gear engages the smaller effective diameter of the planetary gears.

The second sun gear of the first planetary gear set is continuously connected to a sun gear of the second planetary gear set. A carrier of the first planetary gear set is continuously connected to a ring gear of the second planetary gear set. The first and second planetary gear sets thus form what is referred to as a "Simpson gear set". The output shaft is connected continuously to the ring gear of the second planetary gear set.

The drive shaft is connectable via a first of the five shift elements to a carrier of the second planetary gear set, via a second of the five shift elements to the second sun gear of the first planetary gear set, and via a third of the five shift elements to the sun gear of the first planetary gear set. A ring gear of the first planetary gear set is rotationally fixedly immobilizable via a fourth of the five shift elements by the ring gear being connected in a shiftable manner via the fourth shift element to a housing or to some other rotationally fixed component of the gearbox. The first sun gear of the first planetary gear set is rotationally fixedly immobilizable in the same manner via a fifth of the five shift elements.

The rotor of the electric machine of the gearbox is continuously connected to the drive shaft. Furthermore, the gearbox does not have any further electric machine which is continuously rotationally fixedly connected to the first sun gear of the first planetary gear set or operatively connectable with said sun gear by a shift element. It should be pointed out at this juncture that the gearbox may absolutely have further electric machines, for example for driving an oil pump.

The sequence according to the invention of the gearbox elements results in the provision of a gearbox which has at least six forward gear ratios between the drive shaft and the output shaft. In addition, the Simpson gear set enables the gearbox to be distinguished by good mechanical efficiency. The simple design also permits good accessibility to the five shift elements, as a result of which the actuation thereof is simplified. In addition, the gearbox is suitable both for what is referred to as a front-longitudinal arrangement and for what is referred to as a front-transverse arrangement. In the case of a front-longitudinal arrangement, the outer interfaces of the drive shaft and the output shaft are arranged coaxially and at opposite axial ends of the gearbox. In the case of a front-transverse arrangement, the outer interfaces of the drive shaft and the output shaft are arranged coaxially with respect to one another and at the same axial end of the gearbox, wherein the output shaft is operatively connected via a spur gear set to a shaft which is axially parallel to the main axis of the gearbox. The power transmitted by the gearbox can be supplied to an axle transmission via said axially parallel shaft.

At least six forward gear ratios between the drive shaft and the output shaft are selectable, preferably automatically, by selective closing of two of the five shift elements. A first forward gear ratio of the at least six forward gear ratios is formed by closing the fourth shift element and the third shift element. A second forward gear ratio of the at least six forward gear ratios is formed by closing the fourth shift element and the second shift element. A third forward gear ratio of the at least six forward gear ratios is formed by closing the fourth shift element and the first shift element. A fourth forward gear ratio of the at least six forward gear ratios is formed by closing the first shift element and the third shift element. A fifth forward gear ratio of the at least six forward gear ratios is formed by closing the first and the fifth shift element. A sixth forward gear ratio of the at least six forward gear ratios is formed by closing the second and the fifth shift element. In this way, with suitable selection of the fixed carrier transmission ratios of the planetary gear sets, a transmission ratio sequence which is highly suitable for use in the motor vehicle is achieved. In addition, two adjacent forward gear ratios always have a shift element which is closed in both of said gear ratios. This simplifies the shift process and shortens the shift duration between adjacent forward gear ratios. Since in the first to third forward gear ratios the fourth shift element is closed, it is also possible to perform a direct shift between the first and third forward gear ratios. Since in the third to fifth forward gear ratios the first shift element is closed, it is also possible to perform a direct shift between the third and the fifth forward gear ratios. The gearbox thus permits a particularly advantageous plurality of possible direct shift processes, even without engagement of intermediate gear ratios.

In the fourth forward gear ratio, the two planetary gear sets are blocked, and therefore all of the elements of the first and second planetary gear sets rotate at the same rotational speed. This is achievable by closing two of the following shift elements: first shift element, second shift element, third shift element. This applies to all of the embodiments and exemplary embodiments. It is preferable for at least the first shift element to be involved in the formation of the fourth forward gear ratio since the first shift element is also involved in the formation of the third and fifth forward gear ratios. This simplifies the shift process from the third to the fourth forward gear ratio or from the fourth to the fifth forward gear ratio, and vice versa.

The fourth shift element is preferably a positively locking shift element. Positively locking shift elements, for example dog shift elements, are distinguished by lower drag losses in the open state than force locking shift elements, as a result of which the friction losses of the gearbox are considerably reduced. The efficiency of the gearbox is further improved by the low drag losses in the open state, particularly since the fourth shift element is closed only in the first to third forward gear ratios. The fourth shift element is therefore predominantly open during operation of the gearbox at high gear ratios, for example during motorway travel. Since the fourth shift element is closed only in the first to third forward gear ratios, the shift element is always open during shift processes into a higher gear ratio, but is not closed. Opening of a dog shift element is considerably simpler than the closing process since, during the closing, the dogs of the dog shift element first of all have to engage in the gaps provided for this purpose, whereas, during the opening, the dogs merely have to be positioned without load. Both processes require time, with the intention, particularly in the case of shift processes from a low gear ratio into a higher gear ratio, being for the shift time to be as short as possible for dynamic driving reasons. Since, during shift processes into a higher gear ratio, the fourth shift element, however, never has to be closed, but merely open, the fourth shift element being a positively locking shift element does not bring about any restriction in respect of the shift duration.

According to one embodiment, the carrier of the second planetary gear set is rotationally fixedly immobilizable via a sixth shift element by the carrier being connected via the sixth shift element selectively to the housing or to another rotationally fixed component of the gearbox. It is thereby possible to provide at least one mechanical reverse gear ratio between drive shaft and output shaft. This is not absolutely required since a reverse gear ratio is also possible by operating the electric machine counter to a preferred direction of rotation and by engaging one of the forward gear ratios. If, however, the electric machine is not available, for example due to a malfunction or due to an empty energy accumulator, the sixth shift element permits the provision of a conventional mechanical reverse gear ratio.

A first reverse gear ratio is realized by closing the sixth shift element and the third shift element. In addition or alternatively thereto, a second reverse gear ratio is realized by closing the sixth shift element and the second shift element. Both of said reverse gear ratios share a closed shift element with one of the first and second forward gear ratios. This facilitates a shifting process between forward gear ratio and reverse gear ratio.

The sixth shift element is preferably a positively locking shift element, for example as a dog shift element. Since the sixth shift element is closed only in the at least one reverse gear ratio, the sixth shift element is predominantly open during operation of the gearbox in the motor vehicle. The sixth shift element being a dog shift element therefore improves the efficiency of the gearbox.

The sixth shift element and the fourth shift element are preferably actuatable by a common actuating mechanism. Since the sixth and fourth shift elements are not closed at the same time in any gear ratio, such an actuation is possible without restricting the functionality of the gearbox. In a first position of the actuating mechanism, the sixth shift element is closed, and the fourth shift element is open. In a second position of the actuating mechanism, the fourth shift element is closed and the sixth shift element is open. In an optional central position, both the fourth and the sixth shift elements are open. Through this double-acting actuator arrangement, the complexity of the gearbox is further reduced.

According to one possible refinement, the gearbox is blockable by simultaneous closing of the sixth and fourth shift element. A separate parking lock can thereby be dispensed with. If the sixth and fourth shift elements are actuated by a common actuating mechanism, said actuating mechanism has to permit such a shift state.

According to a possible refinement, the second planetary gear set has a second ring gear which is connected to the output shaft. Also in this refinement, the "first" ring gear of the second planetary gear set is connected to the output shaft since the "first" ring gear is connected to the second ring gear via the planetary gears of the second planetary gear set. The connection between the carrier of the second planetary gear set and the sixth shift element is axially between the two ring gears of the second planetary gear set. The two ring gears preferably have the same effective diameter. The rotational speeds of the two ring gears are thus identical, as though they were connected to each other. This refinement permits a coaxial arrangement of drive shaft and output shaft at opposite axial ends of the gearbox in spite of a mechanical reverse gear ratio. Such an arrangement is advantageous particularly in vehicles having what is referred to as a front-longitudinal drive train.

The first and second shift elements are preferably multi-plate clutches which are arranged either radially one inside the other or axially directly next to each other. The radially nested arrangement is advantageous particularly in what are referred to as front-transverse gearboxes in order to keep the axial overall length of the gearbox as small as possible. By contrast, in what are referred to as front-longitudinal gearboxes, a radially compact gearbox is of advantage. In such gearboxes, the arrangement of first and second shift element axially directly next to each other is therefore advantageous.

The gearbox preferably has a connection shaft which can be an interface to an internal combustion engine. The connection shaft can also have a torsional vibration damper. The connection shaft is connectable to the drive shaft via a separating clutch. By opening the separating clutch, a purely electric drive of the motor vehicle by the electric machine of the gearbox is possible without the drive unit connected to the connection shaft being dragged along at the same time.

It is preferable for all the shift elements to be actuatable by a closed hydraulic system. For this purpose, the closed hydraulic system has a pressure accumulator which is a primary pressure supply. If the pressure in the pressure accumulator falls below a threshold value, the pressure in the pressure accumulator is increased by a preferably electrically driven pump. This reduces the power demand of the hydraulic system and thus improves the efficiency of the gearbox. As an alternative to this, the actuation of the shift elements may also be realized by a conventional open hydraulic system in which the pump constantly delivers hydraulic fluid. According to a further alternative, the actuation of the shift elements may also be realized by an electromechanical actuation system. This improves the efficiency of the gearbox and the effort in terms of construction thereof.

The gearbox can be a constituent part of a drive train of a hybrid vehicle. The drive train has not only the gearbox but also an internal combustion engine which is connected to the connection shaft of the gearbox. The output shaft of the gearbox is connected in terms of drive to an axle transmission which is connected to wheels of the hybrid vehicle. The drive train permits a plurality of drive modes of the hybrid vehicle. In an electric drive mode, the hybrid vehicle is driven by the electric machine of the gearbox, wherein the separating clutch is open. In an internal combustion engine mode, the hybrid vehicle is driven by the internal combustion engine, wherein the separating clutch is closed. In a hybrid mode, the hybrid vehicle is driven both by the internal combustion engine and by the electric machine of the gearbox.

A starting process of a hybrid vehicle in the internal combustion engine or hybrid mode with such a drive train is described below. If the third shift element is a multi-plate clutch, the third shift element is preferably a starting element. For this purpose, the separating clutch is closed. The fourth shift element is closed for a forward starting process, and the sixth shift element is closed for a reverse starting process. The third shift element is operated in a slip mode, as a result of which the starting torque transmitted by the drive shaft to the output shaft is variable. If the third shift element is a dog clutch, that is to say a positively locking shift element, such a slip operation is not possible. In this case, a starting process is performed by engaging one of the first two forward gear ratios or reverse gear ratios and by slip control of the separating clutch.

The drive train with the gearbox according to the invention also permits charging of an energy accumulator while the vehicle is at a standstill. For this purpose, the separating clutch should be closed, and no gear ratio should be engaged in the gearbox. The internal combustion engine which is connected to the drive shaft can therefore drive the electric machine which is operated at a generator operating point and thus generates a charging current which is usable for charging the energy accumulator.

A continuous connection is referred to as being a connection between two elements that always exist. Such continuously connected elements always rotate with the same dependency between their rotational speeds. There cannot be a shift element in a continuous connection between two elements. A continuous connection should therefore be differentiated from a selectable connection.

BRIEF DESCRIPTION OF THE DRAWINGS

Exemplary embodiments of the invention are described in detail below with reference to the attached figures.

FIG. 1 schematically shows a gearbox according to a first exemplary embodiment of the invention;

FIG. 2 shows an engagement sequence table of the gearbox;

FIG. 3 shows a sectional illustration of the gearbox according to the first exemplary embodiment;

DETAILED DESCRIPTION

Figure 4:
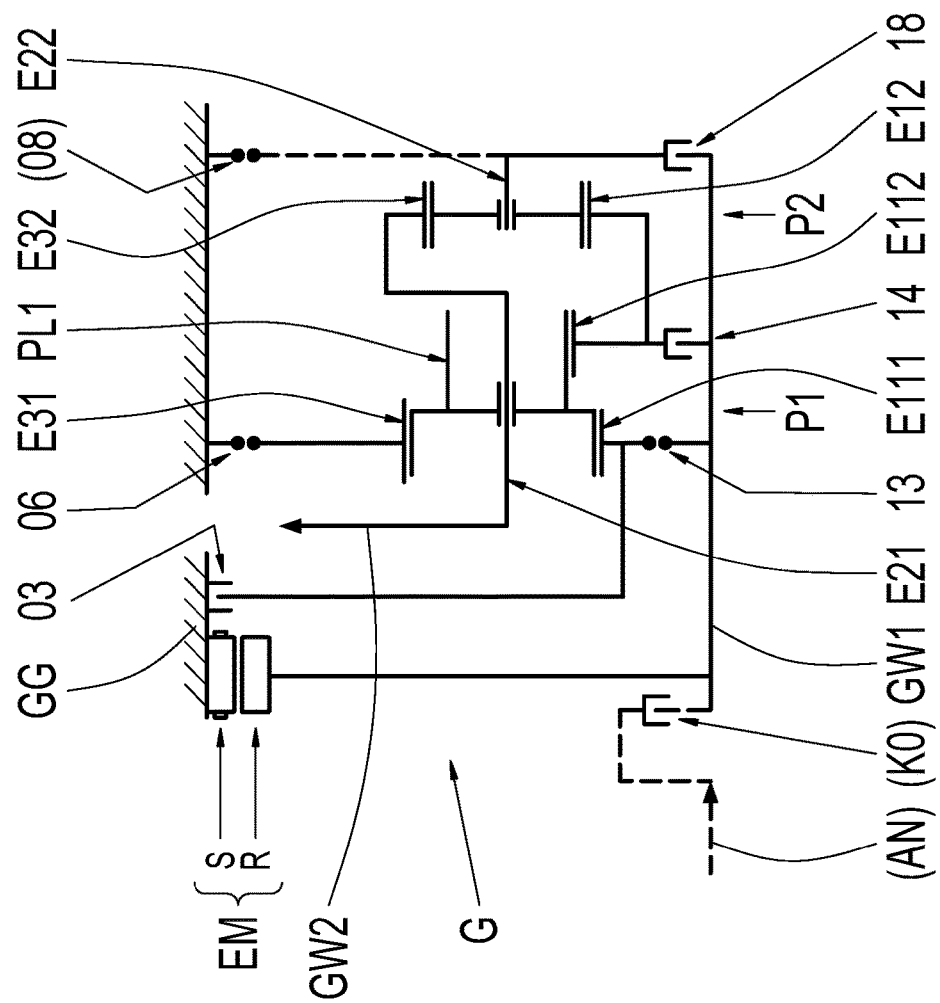
FIG. 4 schematically shows a gearbox according to a second exemplary embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 schematically shows a gearbox G according to a first exemplary embodiment of the invention. The gearbox G has a drive shaft GW1, an output shaft GW2, a first planetary gear set P1 and a second planetary gear set P2. The first and second planetary gear sets P1, P2 are minus gear sets. The first planetary gear set P1 is a stepped planetary gear set, the planetary gears PL1 of which have two differently sized effective diameters. A first sun gear E111 of the first planetary gear set P1 engages the larger effective diameter of the planetary gears PL1. A second sun gear E112 of the first planetary gear set P1 engages the smaller effective diameter of the planetary gears PL1. The second sun gear E112 of the first planetary gear set P1 is continuously connected to a sun gear E12 of the second planetary gear set P2. A carrier E21 of the first planetary gear set P1 is continuously connected to a ring gear E32 of the second planetary gear set P2. The first and second planetary gear sets P1, P2 thus form what is referred to as a "Simpson gear set".

Via a first shift element 18, the drive shaft GW1 is connectable to the carrier E22 of the second planetary gear set P2. Via a second shift element 14, the drive shaft GW1 is connectable to the second sun gear E112 of the first planetary gear set P1. Via a third shift element 13, the drive shaft GW1 is connectable to the first sun gear E111 of the first planetary gear set P1. Via a fourth shift element 06, a ring gear E31 of the first planetary gear set P1 is rotationally fixedly immobilizable by the ring gear being connected selectively by the fourth shift element 06 to a housing GG of the gearbox G. Via a fifth shift element 03, a first sun gear E111 of the first planetary gear set P1 is rotationally fixedly immobilizable in the same manner. Via an optionally provided sixth shift element 08, the carrier E22 of the second planetary gear set P2 is rotationally fixedly immobilizable. The output shaft GW2 is connected to the ring gear E32 of the second planetary gear set P2. The gearbox G optionally has a connection shaft AN which is connectable to the drive shaft GW1 via a separating clutch K0.

The first, second, third and fifth shift elements 18, 14, 13, 03 are force locking shift elements, for example multi-plate clutches or multi-disk brakes. The fourth and the optional sixth shift element 06, 08 are positively locking shift elements, for example dog brakes.

The gearbox G furthermore includes an electric machine or motor EM which has a rotatably mounted rotor R and a rotationally fixedly immobilized stator S. The rotor R is continuously rotationally fixedly connected to the drive shaft GW1.

FIG. 2 shows an engagement sequence table of the gearbox G, which applies to all of the exemplary embodiments. In the rows of the engagement sequence table there are listed six forward gear ratios G1 to G6, and a first and second reverse gear ratio R1, R2. In the columns of the engagement sequence table, the sign X is used to denote which of the shift elements 18, 14, 13, 06, 03, 08 are closed in which gear ratio or operating mode.

FIG. 3 shows a sectional view of the gearbox G according to the first exemplary embodiment, said gearbox being what is referred to as a front-transverse gearbox. Only half of the sectional view is illustrated. It can readily be seen in FIG. 3 that the first, second, third and fifth shift elements 18, 14, 13, 03 are force locking shift elements which are held in the open state by spring devices and are transferable hydraulically into the closed state by displacement by actuating piston. The second shift element 14 is arranged radially within the first shift element 18. The fifth shift element 03 is arranged radially within the third shift element 13. The fourth and sixth shift elements 06, 08 are dog shift elements and are arranged radially outside the first and second shift elements 18, 14. Only a single sliding sleeve SS is provided for actuating the fourth and sixth shift elements 06, 08. The gearbox G according to the first exemplary embodiment is distinguished by a particularly compact construction.

FIG. 4 schematically shows a gearbox G according to a second exemplary embodiment of the invention. In contrast to the first exemplary embodiment, the third shift element 13 is a dog shift element.

Figure 5:
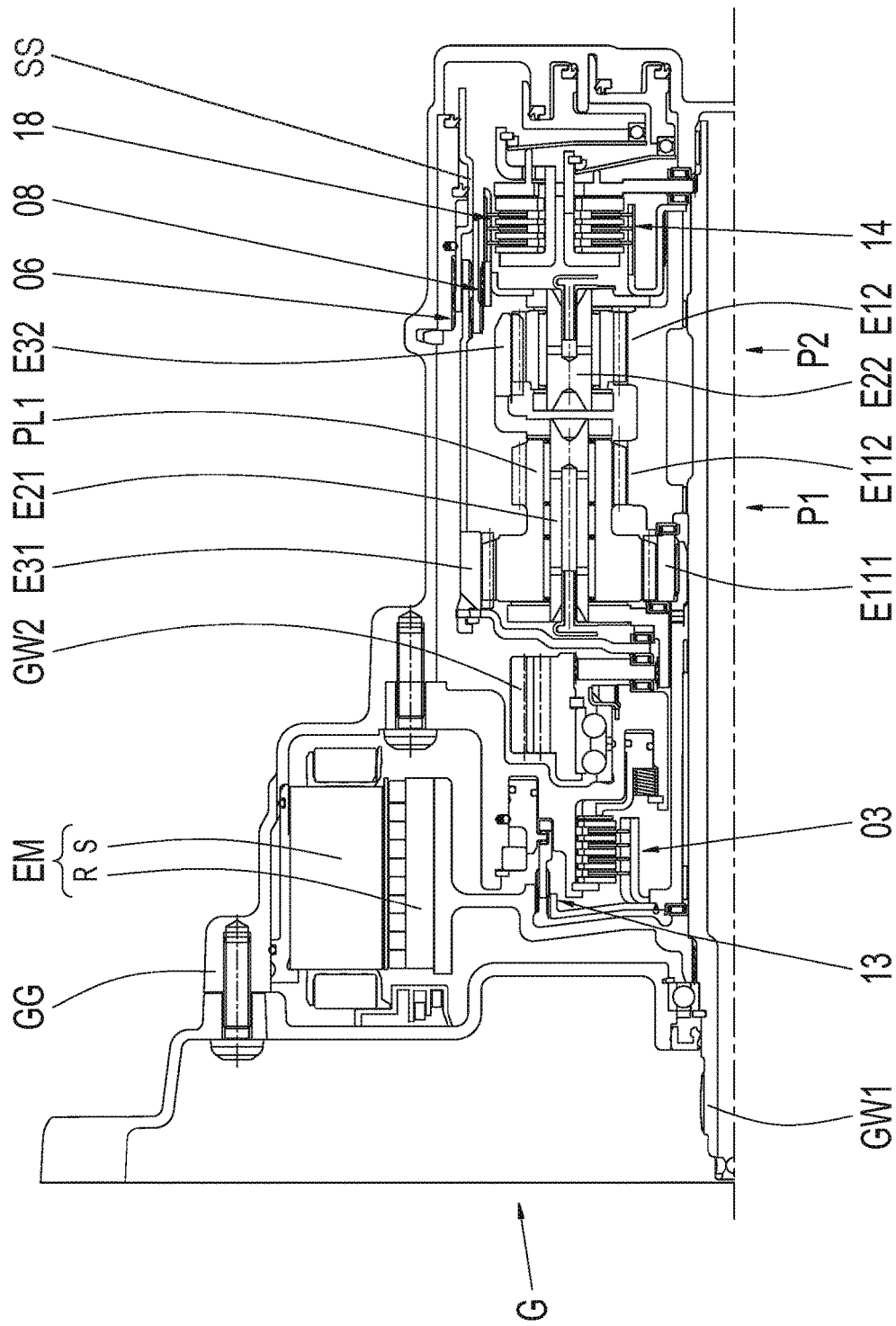
FIG. 5 shows a sectional illustration of the gearbox according to the second exemplary embodiment.

FIG. 5 shows a sectional view of the gearbox G according to the second exemplary embodiment, which is what is referred to as a front-transverse gearbox. The third shift element 13 is arranged radially outside the fifth shift element 03 and has a separate actuating piston.

Figure 6:
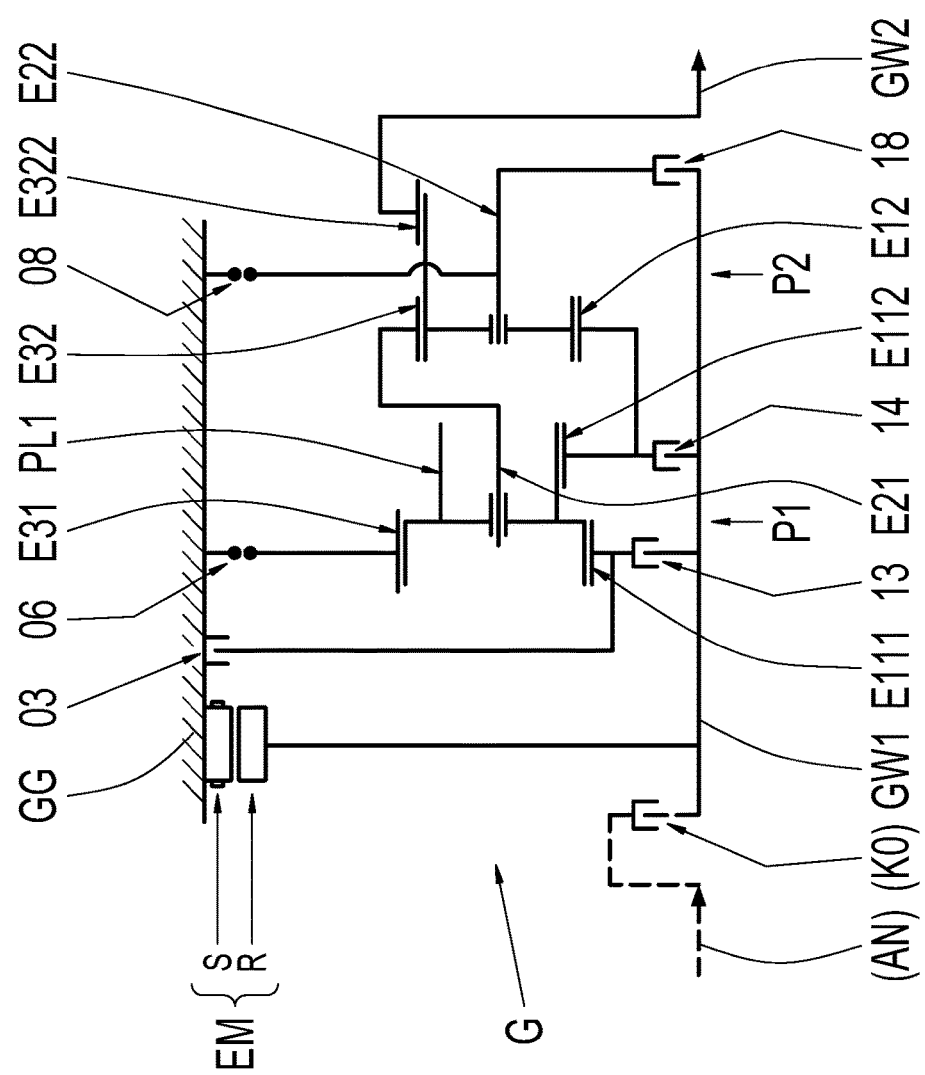
FIG. 6 schematically shows a gearbox according to a third exemplary embodiment of the invention.

FIG. 6 schematically shows a gearbox G according to a third exemplary embodiment of the invention. In contrast to the first exemplary embodiment illustrated in FIG. 1, the gearbox G according to the third exemplary embodiment has a second ring gear E322 assigned to the second planetary gear set P2. The second ring gear E322 is connected directly to the output shaft GW2. As a result, even when the gearbox G has a sixth shift element 08, a coaxial arrangement of input shaft GW1 and output shaft GW2 at opposite axial ends of the gearbox G is possible. The ring gear E32 of the second planetary gear set P2 is furthermore connected to the output shaft GW2 via the planetary gears of the second planetary gear set P2. The connection of the carrier E22 of the second planetary gear set P2 to the sixth shift element 08 is between the ring gears E32, E322 of the second planetary gear set P2.

Figure 7:
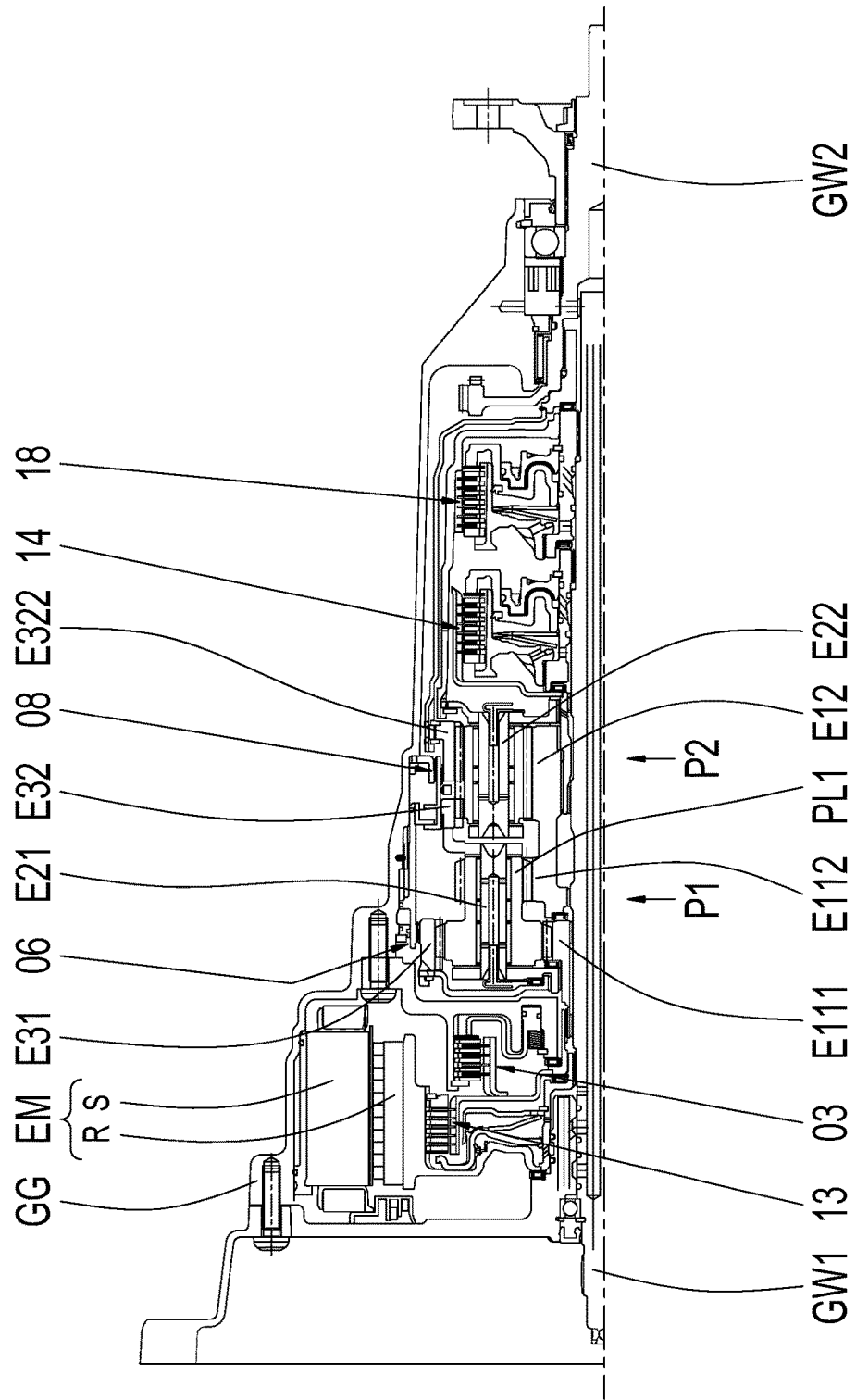
FIG. 7 shows a sectional illustration of the gearbox according to the third exemplary embodiment.

FIG. 7 shows a sectional view of the gearbox G according to the third exemplary embodiment, which is what is referred to as a front-longitudinal gearbox. The fourth shift element 06 is arranged radially outside the first planetary gear set P1. The sixth shift element 08 is arranged radially outside the second planetary gear set P2. Furthermore, only a single sliding sleeve is provided for actuating the fourth and sixth shift elements 06, 08. The first shift element 18 is arranged axially directly next to the second shift element 14, to be precise, between the second planetary gear set P2 and the outer interface of the output shaft GW2. The third and fifth shift elements 13, 03 are arranged radially within the electric machine EM.

The rotor R of the electric machine EM does not have to be connected in a rotationally fixed manner to the drive shaft GW1. Instead, a step-up transmission with a fixed transmission ratio can also be arranged between the drive shaft GW1 and the rotor R, for example a third planetary gear set or a spur gear set. This applies to all of the embodiments or exemplary embodiments. The fixed transmission ratio between drive shaft GW1 and rotor R is preferably selected in such a manner that the rotor R rotates at a higher rotational speed than the drive shaft GW1. As a result, the electric machine EM is configurable to be smaller with the same target torque.

Figure 8:
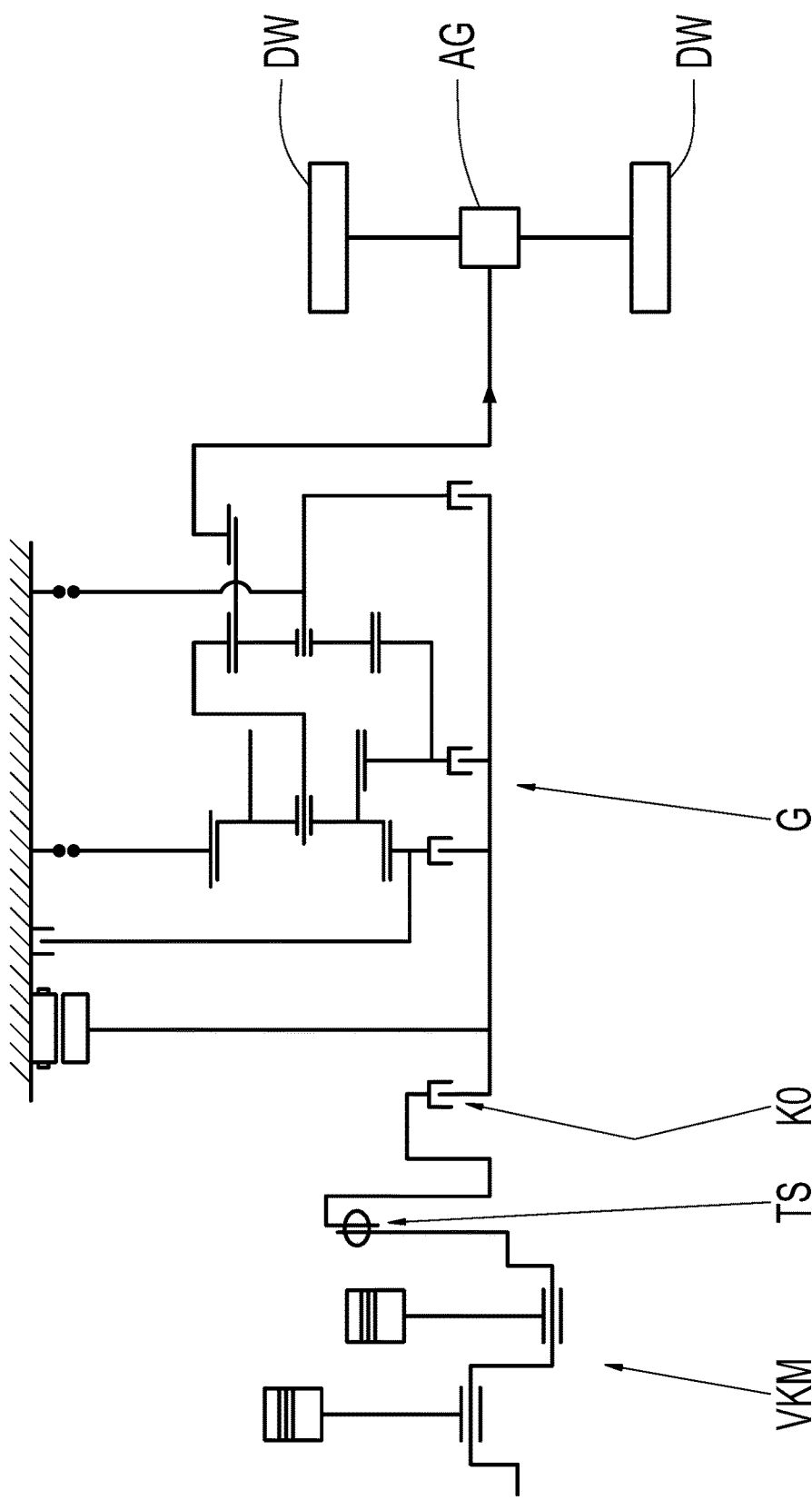
FIG. 8 shows a drive train of a hybrid vehicle.

FIG. 8 shows a drive train of a hybrid vehicle having a gearbox G according to the third exemplary embodiment. This should merely be considered as being by way of example. The drive train could be realized by any of the cited exemplary embodiments of the gearbox G. The drive train has an internal combustion engine VKM connected via a torsional vibration damper TS to the connection shaft AN of the gearbox G. The connection shaft AN is connectable to the drive shaft GW1 of the gearbox G via the separating clutch K0. The output shaft GW2 is operatively drivingly connected to an axle transmission AG. Proceeding from the axle transmission AG, the power which acts at the output shaft GW2 is distributed to wheels DW of the motor vehicle. During the motor mode of the electric machine EM, electric power is supplied to the stator S by an inverter, not illustrated. In the generator mode of the electric machine EM, the stator S supplies electric power to the inverter.

Modifications and variations can be made to the embodiments illustrated or described herein without departing from the scope and spirit of the invention as set forth in the appended claims.

REFERENCE SIGNS

G Gearbox
GG Housing
GW1 Drive shaft
GW2 Output shaft

P1 First planetary gear set
P2 Second planetary gear set
E111 First sun gear of the first planetary gear set
E112 Second sun gear of the first planetary gear set
E21 Carrier of the first planetary gear set
E31 Ring gear of the first planetary gear set
E312 Second ring gear of the first planetary gear set
PL1 Planetary gear of the first planetary gear set
E12 Sun gear of the second planetary gear set
E22 Carrier of the second planetary gear set
E32 Ring gear of the second planetary gear set
E322 Second ring gear of the second planetary gear set
18 First shift element
14 Second shift element
13 Third shift element
06 Fourth shift element
03 Fifth shift element
08 Sixth shift element
EM Electric machine
R Rotor of the electric machine
S Stator of the electric machine
G1-G6 First to sixth forward gear ratios
R1 Reverse gear ratio
R2 Reverse gear ratio
VKM Internal combustion engine
DW Wheels
AG Axle transmission
TS Torsional vibration damper

The invention claimed is:

1. A gearbox (G) for a motor vehicle, the gearbox comprising:
a drive shaft (GW1);
an output shaft (GW2);
five shift elements (18, 14, 13, 06, 03);
an electric motor (EM);
a first planetary gear set (P1), the first planetary gear set (P1) being a stepped planetary gear set having planetary gears (PL1) of a larger effective diameter and planetary gears (PL1) of a smaller effective diameter; and
a second planetary gear set (P2),
wherein the first and the second planetary gear sets (P1, P2) are minus gear sets,
wherein a first sun gear (E111) of the first planetary gear set (P1) engages the planetary gears (PL1) of the larger effective diameter,
wherein a second sun gear (E112) of the first planetary gear set (P1) engages the planetary gears (PL1) of the smaller effective diameter,
wherein the second sun gear (E112) of the first planetary gear set (P1) is continuously connected to a sun gear (E12) of the second planetary gear set (P2),
wherein a carrier (E21) of the first planetary gear set (P1) is continuously connected to a ring gear (E32) of the second planetary gear set (P2),
wherein the drive shaft (GW1) is connectable via a first shift element (18) of the five shift elements (18, 14, 13, 06, 03) to a carrier (E22) of the second planetary gear set (P2), the drive shaft (GW1) is connectable via a second shift element (14) of the five shift elements (18, 14, 13, 06, 03) to the second sun gear (E112) of the first planetary gear set (P1), and the drive shaft (GW1) is connectable via a third shift element (13) of the five shift elements (18, 14, 13, 06, 03) to the first sun gear (E111) of the first planetary gear set (P1),
wherein a ring gear (E31) of the first planetary gear set (P1) is rotationally fixedly immobilizable via a fourth shift element (06) of the five shift elements (18, 14, 13, 06, 03),
wherein the first sun gear (E111) of the first planetary gear set (P1) is rotationally fixedly immobilizable via a fifth shift element (03) of the five shift elements (18, 14, 13, 06, 03),
wherein the output shaft (GW2) is connected to the ring gear (E32) of the second planetary gear set (P2),
wherein a rotor (R) of the electric motor (EM) is continuously connected to the drive shaft (GW1), and
wherein the first sun gear (E111) of the first planetary gear set (P1) is not continuously rotationally fixedly connected to or operatively connectable by one of the five shift elements (18, 14, 13, 06, 03) with any other electric motor.

2. The gearbox (G) according to claim 1, wherein at least six forward gear ratios (G1-G6) between the drive shaft (GW1) and the output shaft (GW2) are selectable by selective closing of two of the five shift elements (18, 14, 13, 06, 03), wherein
a first forward gear ratio (G1) of the at least six forward gear ratios (G1-G6) is realized by closing the fourth shift element (06) and the third shift element (13),
a second forward gear ratio (G2) of the at least six forward gear ratios (G1-G6) is realized by closing the fourth shift element (06) and the second shift element (14),
a third forward gear ratio (G3) of the at least six forward gear ratios (G1-G6) is realized by closing the fourth shift element (06) and the first shift element (18),
a fourth forward gear ratio (G4) of the at least six forward gear ratios (G1-G6) is realized by closing the first shift element (18) and the third shift element (13),
a fifth forward gear ratio (G5) of the at least six forward gear ratios (G1-G6) is realized by closing the first shift element (18) and the fifth shift element (03), and
a sixth forward gear ratio (G6) of the at least six forward gear ratios (G1-G6) is realized by closing the second shift element (14) and the fifth shift element (03).

3. The gearbox (G) according to claim 1, wherein the fourth shift element (06) is a dog shift element.

4. The gearbox (G) according to claim 1, further comprising a sixth shift element (08), wherein the carrier (E22) of the second planetary gear set (P2) is rotationally fixedly immobilizable via the sixth shift element (08).

5. The gearbox (G) according to claim 4, wherein a first reverse gear ratio (R1) is realized by closing the sixth shift element (08) and the third shift element (13), and/or a second reverse gear ratio (R2) is realized by closing the sixth shift element (08) and the second shift element (14).

6. The gearbox (G) according to claim 5, wherein the sixth shift element (08) is a dog shift element.

7. The gearbox (G) according to claim 6, wherein the fourth shift element (06) and the sixth shift element (08) are actuatable by a common actuating mechanism (SS).

8. The gearbox (G) according to claim 4, wherein, to provide a parking lock (P), the sixth shift element (08) and the fourth shift element (06) are blockable.

9. The gearbox (G) according to claim 1, wherein the first and second shift elements (18, 14) are multi-plate clutches arranged either radially one inside the other or axially directly next to each other.

10. The gearbox (G) according to claim 1, further comprising a connection shaft (AN) and a separating clutch (K0), the connection shaft (AN) connectable to the drive shaft (GW1) via the separating clutch (K0).

11. A drive train for a hybrid vehicle, the drive train comprising:
an internal combustion engine (VKM);
the gearbox (G) according to claim 10; and
an axle transmission (AG), the axle transmission (AG) being connected to wheels (DW) of the hybrid vehicle,
wherein the connection shaft (AN) of the gearbox (G) is connected rotationally elastically to the internal combustion engine (VKM) via a torsional vibration damper (TS),
wherein the output shaft (GW2) of the gearbox (G) is operatively drivingly connected to the axle transmission (AG),
wherein the hybrid vehicle is drivable by the electric motor (EM) alone in an electric driving mode when the separating clutch (K0) is open,
wherein the hybrid vehicle is drivable by the internal combustion engine (VKM) alone in an internal combustion engine mode when the separating clutch (K0) is closed, and
wherein the hybrid vehicle is drivable by the internal combustion engine (VKM) and by the electric motor (EM) in a hybrid mode.

12. A method for operating the drive train according to claim 11, wherein the third shift element (13) is a multi-plate clutch, the method comprising:
during a starting operation of the hybrid vehicle in the internal combustion engine or during the hybrid mode, closing the separating clutch (K0) and closing the fourth shift element (06) for forward travel, or closing the sixth shift element (08) and operating the third shift element (13) in a slip mode for reverse travel.

13. A method for operating the drive train according to claim 11, wherein the third shift element (13) is a dog clutch, the method comprising:
during the starting operation of the hybrid vehicle in the internal combustion engine or during the hybrid mode, engaging a first or second forward gear ratio (G1, G2) for forward travel, or engaging a first or second reverse gear ratio (R1, R2) and operating the separating clutch (K0) in the slip mode for reverse travel.

14. A gearbox (G) for a motor vehicle, the gearbox comprising:
a drive shaft (GW1);
an output shaft (GW2);
five shift elements (18, 14, 13, 06, 03);
an electric motor (EM);
a first planetary gear set (P1), the first planetary gear set (P1) being a stepped planetary gear set having planetary gears (PL1) of a larger effective diameter and planetary gears (PL1) of a smaller effective diameter; and
a second planetary gear set (P2),
wherein the first and the second planetary gear sets (P1, P2) are minus gear sets,
wherein a first sun gear (E111) of the first planetary gear set (P1) engages the planetary gears (PL1) of the larger effective diameter,
wherein a second sun gear (E112) of the first planetary gear set (P1) engages the planetary gears (PL1) of the smaller effective diameter,
wherein the second sun gear (E112) of the first planetary gear set (P1) is continuously connected to a sun gear (E12) of the second planetary gear set (P2),
wherein a carrier (E21) of the first planetary gear set (P1) is continuously connected to a ring gear (E32) of the second planetary gear set (P2),
wherein the drive shaft (GW1) is connectable via a first shift element (18) of the five shift elements (18, 14, 13, 06, 03) to a carrier (E22) of the second planetary gear set (P2), the drive shaft (GW1) is connectable via a second shift element (14) of the five shift elements (18, 14, 13, 06, 03) to the second sun gear (E112) of the first planetary gear set (P1), and the drive shaft (GW1) is connectable via a third shift element (13) of the five shift elements (18, 14, 13, 06, 03) to the first sun gear (E111) of the first planetary gear set (P1),
wherein a ring gear (E31) of the first planetary gear set (P1) is rotationally fixedly immobilizable via a fourth shift element (06) of the five shift elements (18, 14, 13, 06, 03),
wherein the first sun gear (E111) of the first planetary gear set (P1) is rotationally fixedly immobilizable via a fifth shift element (03) of the five shift elements (18, 14, 13, 06, 03),
wherein the output shaft (GW2) is connected to a second ring gear (E322) of the second planetary gear set (P2),
wherein a rotor (R) of the electric motor (EM) is continuously connected to the drive shaft (GW1), and
wherein the first sun gear (E111) of the first planetary gear set (P1) is not continuously rotationally fixedly connected to or operatively connectable by one of the five shift elements (18, 14, 13, 06, 03) with any other electric motor.

15. The gearbox (G) according to claim 14, wherein a connection between the carrier (E22) of the second planetary gear set (P2) and a sixth shift element (08) is between the ring gear (E32) and the second ring gear (E322) of the second planetary gear set (P2).

* * * * *